May 2, 1944.　　　O. J. BURKE　　　2,347,988
VALVE CONSTRUCTION
Filed Oct. 20, 1943　　　2 Sheets-Sheet 1

INVENTOR.
ORMONDE J. BURKE
BY William T. Kiesner
ATTORNEY

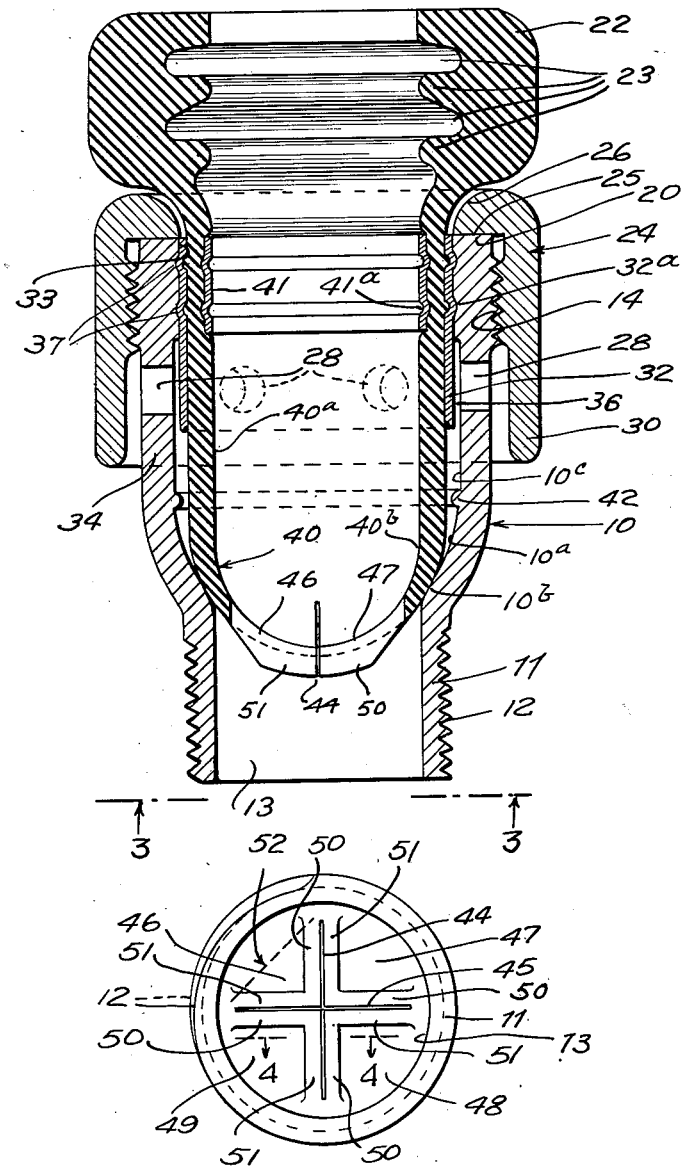

Patented May 2, 1944

2,347,988

UNITED STATES PATENT OFFICE 2,347,988

VALVE CONSTRUCTION

Ormonde J. Burke, New York, N. Y.

Application October 20, 1943, Serial No. 506,957

17 Claims. (Cl. 137—69)

This invention relates to valve construction, more particularly to a valve construction for use in hydraulic circuits, lines, piping, tubing, hose or the like, wherever exists risk of reverse flow under atmospheric pressure or by a syphonic action, upon failure of head or pressure in the supply side of the hydraulic circuit or system.

One of the objects of this invention is to provide a valve construction of the above-mentioned character that will be of simple and inexpensive construction, yet of dependable and efficient action. Another object is to provide a valve construction of the above-mentioned character that will dependably cope with the various variables met with in hydraulic circuits or systems of the above-mentioned nature, and that can be embodied in compact, strong and durable form. Another object is to provide a valve construction of the above-mentioned character that can be embodied inexpensively in compact and easily applicable form and yet be of efficient and reliable action, thereby to encourage and extend its use and application, particularly for household installations or purposes where, as is well known, there are present in household water supply systems risks of contaminating the water supply by back-flow of waste, sewage, or contaminated water, upon failure of the pressure or head in the supply side of the system. Another object is to provide a valve construction of the just-mentioned character that will be well adapted also for industrial uses, such as those where flow of liquids to or from tanks or the like has to be controlled and wherein the hydraulic system has inherently the risk of back flow upon loss or failure of head or pressure upon one side of the system.

Another object is to provide a valve construction of the above-mentioned character that will provide, in a simple and dependable manner, multiple safeguards against or controls of flow of liquid or of air from the atmosphere or both, to prevent back flow or syphonic action. Another object is to provide a valve construction of the just-mentioned character in which a succession or series of valve actions can be made to take place automatically to an extent and in accordance with the nature, magnitude, or number of variables encountered, to effect the desired and intended control. Another object is to carry out the last two mentioned objects in a structural form which will be simple, strong, reliable and durable, and easily installed. Other objects are to provide elements of such a valve construction that will by themselves, or individually, be easy and inexpensive to fabricate and capable of facility of assembly and also of ultimate installation as assembled, and capable when assembled of long continued functioning in the desired manner.

Another object is to provide a valve construction of the above-described character which will be capable of dependable and inexpensive embodiment in the form of a compact unit that will be capable of facility and ease of installation. Another object is to provide a unit construction of the just-mentioned character that will be capable of easy and inexpensive embodiment in various forms such as for permanent installation in a hydraulic system, or in a form capable of ready attachment to a faucet and to a hose line. Other objects will be in part obvious or in part pointed out hereinafter.

The invention accordingly consists in the features of construction, combinations of elements, and arrangements of parts, all as will be exemplified in the structure to be hereinafter described and the scope of the application of which will be indicated in the following claims.

In the accompanying drawings,

Figure 2 is a central vertical sectional view of a valve unit constructed for ready attachment to a faucet or the like, as when it is employed in connection with a hose line;

Figure 1:
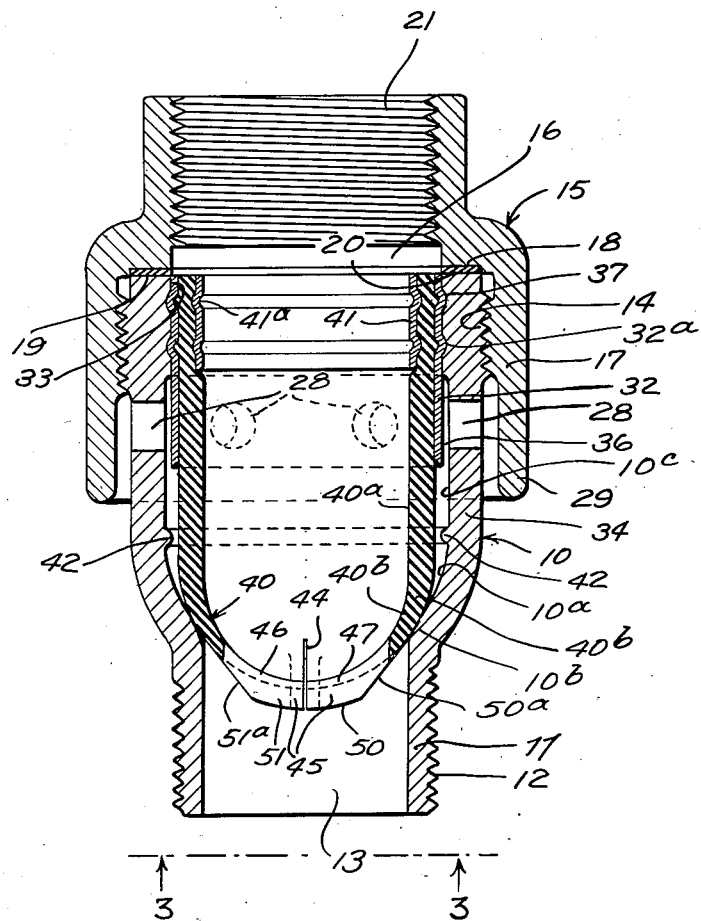
Figure 1 is a central vertical sectional view of a valve unit for incorporation, for example, into a pipe line.
Figure 4:
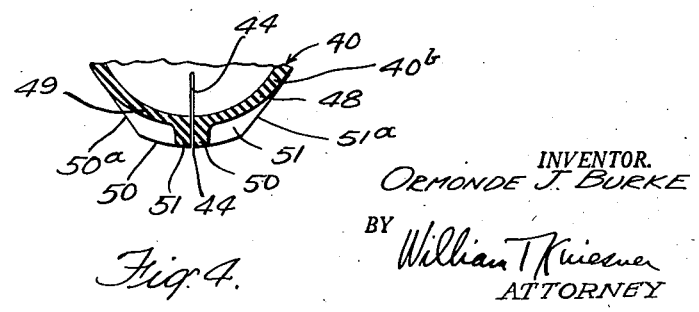

Figure 3 is a bottom elevation as seen along the line 3—3 of Figures 1 and 2; and Figure 4 is a detached sectional view of a portion of a valve element, as seen along the line 4—4 of Figure 3.

Similar reference characters refer to similar parts throughout the several views of the drawings.

In a preferred embodiment of my valve construction, I first provide a casing element generally indicated by the reference character 10, made of any suitable material, preferably a metal such as brass or the like, and conformed to provide certain valve seats as later described for coaction with a valve element. It is preferably and illustratively of generally cylindrical shape, and at its lower end terminates in an extension 11 which may be constructed to have, or otherwise provided with, any suitable means for making connection to a pipe line, hose line or the like. Thus, it may be externally threaded as at 12 and by means of the threads 12 a pipe coupling, hose coupling or the like, may be placed in threaded engagement with the extension 11 of the casing 10, the extension 11 providing the discharge or outlet end or passage, generally indicated by the reference character 13 through which the liquid to be handled in the system passes on its way out of the valve unit.

At its upper end, the cylindrical valve casing 10 is provided with means for attaching the unit to the pressure side of the hydraulic system or pipe line and this means may vary preferably according to whether the valve is to be permanently installed in a pipe line or is to be detachably installed, as at the pressure end of a hose or flexible tube, as for use in connection with a household washing machine, for example. For these and other purposes later explained, I prefer to provide the upper end of the casing 10 with threads, preferably external, as indicated at 14. And where the unit is to be permanently or fixedly installed, I utilize the threads 14 to secure to the casing 10 a coupling generally indicated by the reference character 15, having a passage 16 therethrough which is in line with the upper, otherwise open, end of the casing 10 and having a larger-diametered downward sleeve extension 17 which is internally threaded for coaction with the threads 14. The part 15 is preferably formed or machined to have an annular internal shoulder or face 18 which becomes juxtaposed to the upper annular shoulder or face 20 of the casing 10, and for tightness or sealing, a washer or packing of any suitable material, indicated at 19, may be interposed between the two faces 18 and 20 to form, under compression, a sealed junction.

The upper part of the member 15 may be threaded, illustratively internally as at 21, for threaded connection with, for example, a pipe.

Where the valve unit is to be detachably installed, as onto the end of a faucet or spigot that has no threads, I provide it, at its upper end as as shown in Figure 2, with a heavy rubber nipple 22 of suitable elasticity and suitably fluted internally as at 23, so that it may be stretched or forced onto the tube-like end of the faucet or a pipe line for that matter, thus placing it in elastic tension and thereby effecting a secure grip, the fluting 23, particularly when wet, aiding in effecting tightness of seal. A preferred assemblage of the attaching nipple 22 to the valve unit is later described.

If the attaching nipple 22 is employed, I thread onto the external thread 14 of the casing 10 a threaded sleeve or collar 24 provided with an internal annular shoulder or face 25 adapted to take against the upper annular face or shoulder 20 of the casing 10, the resultant clamping action holding the sleeve element 24 securely assembled to the casing 10. The upper end of the sleeve 24 is externally machined or shaped, as at 26 of Figure 2, to form an upwardly and outwardly flaring seat of substantial area to back up and support and protect the neck-like portion of the nipple 22, thus aiding in supporting and also protecting the latter.

Intermediate of the upper and lower ends of the casing 10, I provide in the latter suitable apertures 28, being in aggregate size adequate to permit sufficient flow therethrough and into the valve structure of air under the influence of external atmospheric pressure under conditions of operation later described. These apertures may most conveniently be formed as by drilling a suitable number of suitably diametered holes. Externally, the apertures 28 are protected or covered by a skirt or annular flange which in the construction of Figure 1 is indicated at 29 and is formed as a downward extension of the pipe coupling member 15 and which in the structure of Figure 2 is a downward extension 30 of the sleeve or collar element 24. In each case, the outer protective flange is preferably of considerable downward extent for better protection of the apertures 28 and is of sufficiently larger internal diameter than the external diameter of the casing to insure little resistance to the flow of air from the atmosphere to and through the apertures 28.

Internally of the casing 10, I preferably provide a sleeve 32 which overlies but is spaced radially inwardly from the apertures 28 and, preferably and conveniently, the sleeve 32 is carried by or secured to an upper internal portion 33 of the casing 10 that is of lesser internal diameter than that of the lower casing portion 34 in which the apertures 28 are formed, thereby providing a downwardly open annular passage 36 through which air that comes through the apertures 28 enters into the interior of the casing 10, and providing also for certain other structural and functional features later described.

The sleeve 32 may be made of suitably heavy sheet metal and may be secured in the above described position and relationship in any suitable manner, but preferably it is made to coact with other structural features. Thus, where it is desired to achieve certain features of assembly later described, I may annularly recess the internal cylindrical face of the upper portion 33 of the casing 10, preferably providing it with several annular recesses 37 of suitable axial dimension and of suitable depth, preferably merging their upper and lower ends into the internal surface of the portion 33. Against and into the annular recessed portion, I expand or spin the metal of the upper portion of the sleeve 32, as indicated at 32ᵃ, thus similarly recessing the sleeve itself. Also, in this or in any other desired way, the joint between the sleeve 32 and the casing portion 33 is made fluid-tight.

Within the sleeve 32 and resting against the walls thereof is suspended a multiple valve element, generally indicated by the reference character 40, being made of any suitable flexible or elastic means, such as rubber. Its major upper portion 40ᵃ is cylindrical and preferably of substantially uniform thickness, and its lower portion 40ᵇ is substantially hemispherical and of progressively varying thickness as is later described in greater detail. It is held in position and sealed at its upper end to the upper casing portion in any suitable way, but preferably and illustratively, by means of a collar 41 of a suitable heavy sheet metal which is dimensioned to be inserted through the upper end of the rubber valve element 40 to a position where it overlies the annular recesses formed by the expanding or spinning of the upper portion of the sleeve 32, whence the sleeve or collar 41 is expanded or spun to compress the circumferentially underlying rubber of the multiple valve element 40 and press it into the annular recesses. Thereby a secure mounting of the rubber element 40 is achieved and also a dependable sealing of its upper portion to or against the upper internal portion 33 of the casing is achieved.

Where, as in the embodiment shown in Figure 2, a rubber attaching nipple 22 is to be employed, I preferably form the nipple 22 and multiple valve unit as a single integral rubber entity, the mounting of the valve element 40 in the valve casing 10, as above described, thus also serving to mount the nipple 22 in proper assemblage to the casing 10 for thus detachably securing the valve structure 10 into the pressure side of the hydraulic system.

The lower edge of the internal rigid sleeve 32 is bevelled off or rounded over downwardly and outwardly to form an annular supporting surface to guard against sharp-angled distortion of the rubber valve element 40 under certain conditions of use, while the sleeve 32 extends preferably materially below the lowermost aligned edges of the apertures 28.

Spaced downwardly from the lower open end of the annular passage 36 there is provided on the internal wall of the casing 10, as by machining in a lathe, an inwardly directed annular rib 42 for coaction with the valve member 40. Rib 42 is preferably rounded over at its upper and lower peripheral edges and it projects inwardly to an appropriate extent toward the outer cylindrical surface of the valve member 40, but the difference in diameters of the two parts is such that normally, and hence in the position shown in Figures 1 and 2, there is a substantial annular space through which air may flow under certain conditions of operation.

The internal surface of the casing 10, below the rib 42, curves or merges inwardly as at 10$^a$, being preferably concave, whence it merges as at 10$^b$ into the cylindrical outlet passage 13, being preferably substantially convex at the portion 10$^b$.

As above pointed out, the lower end portion 40$^b$ of the valve element 40 is substantially hemispherical, and the radius of curvature of the concave casing portion 10$^a$, which thus may also be a portion of a spherical surface, is sufficiently larger than the radius of curvature of the rubber valve portion 40$^b$ to provide for an annular passageway between the two parts that becomes progressively narrower, being narrowest in the region of the convexity 10$^b$.

The thickness of the rubber in the lower hemispherical portion 40$^b$ progressively diminishes substantially as indicated in the drawings, from the normal thickness of the upper portion 40$^a$ to a thickness at or about the bottom mid-point that is, for example, about one-third of the thickness of the portion 40$^a$; this is indicated by the broken lines in Figures 1 and 2 and appears also from Figure 4. This progressive diminution in thickness achieves, as is later explained, a progressive variability of action of the rubber valve member 40 under internal pressures.

The lower hemispherical portion 40$^b$ is provided with suitable self-closing slits which, illustratively and preferably, comprise two slits 44 and 45 intersecting each other and extending at right angles, thus forming four sector-shaped flaps 46, 47, 48 and 49, as is better shown in Figure 3. These slits may be molded during the manufacture of the rubber valve element and in such case are preferably as narrow as is practicable for molding, but each sector-shaped flap is provided with reinforcing ribs 50 and 51 (Figures 3 and 4) which merge or join at the apex of the sector or at the point where the slits intersect, the reinforcing ribs, however, being tapered off as at 50$^a$ and 51$^a$ (Figures 1, 2 and 4) to merge at their outer ends into the hemispherical surface of the portion 40$^b$.

The contacting faces of adjacent ribs form in effect extensions of the faces of the rubber parts that define the slits and when in face to face contact (in the drawings the width of the slits is exaggerated) and particularly when wet they can form a tight seal or closure.

The tapering off of the height of the reinforcing ribs also has the effect of giving each flap a definite hinge-like connection or mounting in that each flap can hinge or swing downwardly, as viewed in Figures 1 and 2, about an axis that may be represented by substantially a chord or straight line connecting the ends of the slits that define the side boundaries of each flap; in Figure 3, one such chord is indicated by a broken line at 52.

When the structure is connected into a hydraulic system, and flow is effected from the upper or inlet end thereof, as viewed in either Figure 1 or Figure 2, toward the outlet end 13, several actions take place; the flap-like sector-shaped flaps 46, 47, 48 and 49 swing downwardly, the flexing or hinging thereof, as about the line 52 for flap 46 in Figure 3, taking place with ease and nicety of action to provide a substantial size of orifice for the discharge of the flowing liquid through the lower end of the rubber valve element 40 and into the outlet 13 and on into the hydraulic system, but offering sufficient resistance to develop velocity head against the interior walls of portion 40$^b$ and thereby to effect good seating against the casing part or seat 10$^b$. This hinge action, moreover, takes place with minimum of distortion, due to the above-described hinge action and lesser wall thickness provided along the line of the hinge, of the curved or spherical side walls of the lower portion 40$^b$, and by using more sector-shaped flaps than the illustrative four above described, even such possible distortion as might take place can be still further reduced. Preferably, however, the ends of the slits fall on a radius preferably considerably shorter than the radius of the casing part 10$^b$ (Figures 1 and 2), thus to aid in avoiding transmission of possible distortion due to flap hinging to the upper curved portions of the valve element 40$^b$.

In normal or at rest position, as above noted, there is a small annular space between the lower portion 40$^b$ of the valve element and the convex shoulder or seat 10$^b$, but when flow is started as above described, the static head or velocity head, or both, achieves a downward elongation of the rubber member 40 or expands the lower hemispherical portion, even though the flap elements are opened for flow; either or both of these actions may be present as desired; preferably, I utilize both. Both are facilitated and the action creating them made more sensitive to pressure by reason of the changing thickness of the rubber element in its transition from the upper cylindrical portion to the region of the midpoint or axis of its lower hemispherical portion, thus insuring lesser resistance to change in configuration under the internal pressure and thus bringing about an immediate or quick peripheral seating against the convex seat 10$^b$. That seating closes off access of air from the atmosphere into the path of flow of the liquid so that the flowing liquid does not act as a suction pump, and it also closes off access of flowing liquid to the annular passage that leads to the apertures 28 so that leakage of liquid from the system does not take place.

It will be understood that, if desired, the assemblage of the parts may be such that, normally or in the at rest position of the parts, a peripheral portion of the portion 40$^b$ engages and is substantially tangent to the convex portion 10$^b$; in such case, the above-described actions still take place, but effect a tighter seating and in both cases the area of mutual seating contact, for sealing, can be of substantial extent due to the self-accommodation of the rubber element to the internal curvatures of the lower casing portion.

As the internal pressure increases, the suspended portion of the rubber valve element 40 is increased in radius, the action being a progressive one from about the region of the convexity 10b in an upward direction, the rubber walls of valve member 40 being progressively more and more laid against the concave surface 10a, thus increasing the initial sealing or closing above described, and then engaging the rib 42 to effect thereby another sealing or closing. Continued increase in pressure can effect outward bulging of that annular part of the cylindrical portion 40a that is suspended between the lower end of the tube 32 and the rib 42, bringing it tightly up against the surface 10c. Usually, during normal flow of liquid through the system, the pressure may be insufficient to achieve this last-mentioned seating of a portion of the rubber valve member 40 against the surface 10c, but should the flow be stopped as by a shut-off in that part of the system connected to the outlet side 13 of the valve structure, the static head can and does effect seating of the rubber element, not only against the rib 42, but also against the cylindrical surface 10c, thus insuring against escape of liquid from the system by way of the apertures 28.

The system is thus maintained leak-proof during normal operation, that is, during normal flow of liquid through the valve structure, when velocity head is principally effective to maintain a seal against the surfaces 10b and 10a, aided, according to circumstances, by static head to effect a still further seating against the rib-like seat 42, and upon shut-off on the outlet side of the valve structure, the resulting built-up static head follows up with certainty of seating against the rib-like seat 42 and also of the side walls of the portion 40a against the wall surface 10c. Furthermore, the structure can function to avoid water hammer effects as when the liquid is quickly or suddenly shut off in that part of the system connected to the outlet side of the valve structure; in such case, the pressure is rapidly and in some cases suddenly built up to substantial values due to the corresponding reduction to zero of the velocity factor of the flow and in such case the built-up or increased pressure is dissipated in increasing the radial dimensions of the cylindrical portion 40a of the rubber valve element 40, bulging it outwardly against the casing wall 10c. The internal volume of the chamber or space within the member 40 is thus increased, aiding in avoiding water hammer effects in a manner suggestive of the action of a stand pipe or surge tank. The tightness of seal that follows from these actions is increased and thus greater insurance against leakage of liquid through the apertures 28 is achieved. These actions also take place in varying degrees when, for example, instead of quickly shutting off the flow, a back pressure is progressively built up as the flow is progressively diminished as when a valve or nozzle or the like is gradually brought to shut-off position.

In any case, dependable assurance against leakage or escape of liquid out of the apertures 28 is achieved in that the seal effected by the portion 40b of the rubber valve element 40 against the surface 10b or the surface 10a, or both, effected, one might say, primarily by velocity head, can be and is supplemented by sealing action of the portion 40a against the rib 42 and sealing action against the surface 10c, these actions preferably taking place successively as will now be understood.

Should conditions arise where, for example, the pressure head on the inlet side of the valve structure is lost so that a syphoning action takes place to reverse the flow of the liquid in the system and hence cause the outlet 13 to become an inlet and the upper inlet end of the valve construction to become the outlet, the structure operates quickly and dependably to stop such reverse flow, which, in a household water system, could be contaminating, by bringing about the quick admission of air from the atmosphere, thus to break the liquid stream in the system at the valve structure by a column of air admitted at the valve structure into the system.

When such a condition arises, the initial cessation of flow in the proper direction removes the velocity head that operates upon the sector-shaped flaps 46, 47, 48 and 49, and which during normal flow holds them open, whence, due to the elastic character of the material of the valve element 40, swing or hinge into closing position, bringing the relatively large faces of the ribs 50 and 51 into engagement and closing the slits. Any tendency of flow in reverse direction operates to tend to swing these flap elements more tightly together, thus physically dividing the column of liquid in the system.

The outlet end of the valve element 40 is thus tightly closed, and the tightness is increased by the suction effect caused by the reversely moving syphon column of liquid in that part of the system that is connected to the upper or inlet end of the valve structure.

These actions operate to diminish the radius of the lower hemispherical portion 40b of the rubber valve element 40, drawing its walls inwardly and upwardly and hence away from seating and sealing contact with the wall portion 10b or 10a, or both, the loss of pressure or velocity head having previously permitted the freely suspended portion 40a to contract under its elasticity or resiliency away from rib 42 and wall seat 10c. The system is thus quickly exposed to the atmosphere by way of the apertures 28 and the above-mentioned uncovered seats from which the above-described actions have effected withdrawal of the portions of the rubber element 40, the progressively diminishing thickness of the hemispherical lower portion 40b thereof facilitating inward flexing thereof or a shortening up of the radius thereof to unseat the rubber element at the portion 10b or 10a, or both. The construction will thus be seen to be such that, though during normal operation sealing is first effected at the seat 10b followed successively by increased seating, as at 10a, and then at the rib seat 42 and, if necessary, also at the seat 10c, each succeeding seat requiring, in the preferred embodiment and as appears from Figures 1 and 2, a greater range of outward distention of the member 40, abnormal conditions that bring about syphoning action or a vacuum effect are invariably such as to quickly effect unseating at whatever seats the rubber element 40 happens at the moment to be seated against; in this latter connection, the unseating may, according to circumstances, take place successively, as, for example, an unseating first at the seats 10c and 42 when the pressure head initially drops sufficiently, followed by prompt unseating in the region of seat 10$^b$ when vacuum or syphonic conditions are initiated.

In any case, quick unseating is reliably effected and the resultant ingress of air permits instantaneous drop of the liquid, by gravity, in the region below the seat 10$^b$, thus preventing transfer of liquid in that part of the system connected to the outlet side of the valve to that part of the system connected to the normal inlet side of the valve structure.

Once the unseating is achieved to admit air from the atmosphere to the space about and external of the rubber valve element 40, the pressure of the atmosphere presses inwardly upon the suspended portion of the member 40, tending further to compress it in a direction to reduce its radius or radii, insuring maintenance of unseated relationship of the rubber element 40 with respect to the various seats, and air is admitted through the slits 44 and 45 to the interior of the rubber element 40 and hence to that side of the system in which the syphonic action or below-atmospheric pressure is being created, thus "breaking" the "vacuum" and halting the syphoning action. This ingress of air through the lower valve elements or flaps of the member 40 can take place slowly or rapidly, according to circumstances. Ordinarily, ingress of air, as permitted by the effective orifice areas of the slits, will take place at a sufficient rate to prevent syphoning of the liquid on the outlet side of the valve.

Restoration of flow or of pressure head of liquid in the direction from the inlet side of the valve toward the outlet side closes off the ingress of air to the system and the functioning of the structure can again proceed as earlier above described.

It will thus be seen that there has been provided in this invention a valve construction in which the various objects hereinbefore noted together with many thoroughly practical advantages are successfully achieved. It will be seen that the valve structure is composed of individual elements that facilitate manufacture and rapid and inexpensive assembly and at the same time achieve reliable and efficient action and operation to meet the widely varying conditions of hard practical use.

In the foregoing description, I have referred to the member 40 as being of rubber, but by the term "rubber" as used herein I do not intend to be restricted to the use of natural rubber, but include therein any other material, including synthetic rubbers, that have appropriate characteristics of flexibility, stretchability and recovery, or elasticity, to serve the purposes above described.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. A valve construction of the character described comprising a casing having an inlet end and an outlet end with a chamber therebetween, said chamber having therein means forming an air inlet and also means forming a succession of seats spaced between said air inlet and said outlet end, and a member within said chamber and in sealed connection therewith on that side of said air inlet that is toward said inlet end, said member being made of rubber and being of an extent to overlie said succession of seats, and the normal spacing between said member and said succession of seats being progressively less in the direction toward said outlet end whereby, under the effects of internal pressure on said member, seating of the latter against said seats takes place successively to prevent ingress of air from said air inlet and unseating thereof takes place in reverse succession to permit ingress of air.

2. A valve construction of the character described comprising a casing having an inlet end and an outlet end with a chamber therebetween, said chamber having therein means forming an air inlet and also means forming a succession of seats spaced between said air inlet and said outlet end, and a member within said chamber and in sealed connection therewith on that side of said air inlet that is toward said inlet end, said member having walls that are made of rubber and being of an extent to overlie said succession of seats, the portions of the walls of said member that respectively overlie said seats being constructed to have different resistances to flexing under the effects of internal pressure to thereby effect seating thereof against said seats at respectively different internal pressures.

3. A valve construction of the character described comprising a casing having an inlet end and an outlet end with a chamber therebetween, said chamber having therein means forming an air inlet and also means forming a succession of seats spaced between said air inlet and said outlet end, and a member within said chamber and in sealed connection therewith on that side of said air inlet that is toward said inlet end, said member being made of rubber and being of an extent to overlie said succession of seats, and said member being of different thicknesses to respond correspondingly differently to internal pressures to thereby effect seating thereof against said succession of seats sequentially.

4. A valve construction of the character described comprising a casing having an inlet end and an outlet end with a chamber therebetween, said chamber having therein means forming an air inlet and also means forming a plurality of seats spaced between said air inlet and said outlet end, said seats being annular and at least certain of them being of different radii, and a rubber sleeve-like member in sealed connection on that side of said air inlet that is toward said outlet end and having portions respectively overlying said spaced annular seats and responsive to internal pressures to effect seating of said portions against said seats at different internal pressures substantially in accordance with the said different radii of said seats.

5. A valve construction as claimed in claim 4 in which at least certain portions of said rubber member are externally of different radii to thereby cause them to respond differently to internal pressures and thereby substantially correspondingly alter the respective pressures at which they are seated against their respective seats.

6. A valve construction of the character described comprising a casing having an inlet end and an outlet end with a chamber of circular cross-section therebetween, said casing having means forming an air inlet to said chamber intermediate of its ends and said chamber having an internal annular shoulder intermediate of said inlet end and said air inlet means, a sleeve-like rubber valve element of lesser diameter than that of said chamber and in sealed connection with said shoulder and extending below and spaced inwardly from said air inlet means into juxtaposed relation to the portion of said chamber adjacent said outlet, annular valve seat means on said lower portion of said chamber against which a lower end portion of said rubber valve member is resiliently pressed under the effects of internal pressure, and rigid sleeve means spaced inwardly from said air inlet means to prevent internal pressure within said sleeve-like rubber valve element from expanding an intermediate portion thereof into and against said air inlet means.

7. A valve construction as claimed in claim 6, in which said rigid sleeve means is interfitted with said annular shoulder and said rubber sleeve element has an internal expanded ring compressing a portion of said sleeve element radially outwardly toward said shoulder to anchor it in position against said rigid sleeve means and to effect said sealed connection.

8. A casing having an internal chamber of circular cross-section terminating in an inlet end and an outlet end and having means forming an air inlet intermediate of said inlet and outlet ends, means in said chamber intermediate of said air inlet means and said outlet end and forming an annular valve seat, and an elongated rubber valve element of circular cross-section within said chamber and in sealed connection with the walls of the latter adjacent said inlet end and extending downwardly toward said outlet end, said rubber element terminating adjacent said outlet end in a substantially hemispherical extension thereof provided with slit means that open up under the effects of internal hydraulic pressure, said chamber having adjacent said outlet end an annular internal portion against which an annular external portion of said hemispherical extension is pressed in seating relation under internal hydraulic pressure, an intermediate portion of said rubber valve element being expansible under internal pressure into seating relation to said annular valve seat.

9. A casing having an internal chamber of circular cross-section terminating in an inlet end and an outlet end and having means forming an air inlet intermediate of said inlet and outlet ends, a sleeve-like rubber valve element within said chamber and in sealed connection therewith on that side of said air inlet means that is toward said inlet end, said casing having an annular portion below said air inlet means, said annular portion being internally concave to form a seat and said rubber sleeve-like member having an annular expansible portion that is externally convex and that extends within said concave annular casing portion to be pressed thereagainst by pressure exerted internally of said rubber valve element to thereby seal off said air inlet means, said concave casing portion and said convex portion of said rubber valve element having relative curvatures that provide variability of area of contact between them substantially in accordance with changes in pressures within said rubber valve element whereby increase in internal pressure increases the expansion of said convex portion and thereby lays a greater area thereof against said seat to increase the sealing-off of said air inlet means and decrease in internal pressure permits contraction of said convex portion to decrease said area of contact.

10. A casing having an internal chamber of circular cross-section terminating in an inlet end and an outlet end and having means forming an air inlet intermediate of said inlet and outlet means, a sleeve-like rubber valve element in sealed connection with said casing on that side of said air inlet means that is toward said inlet end and extending toward said outlet end where it terminates in and is closed by a substantially hemispherical extension thereof, said extension having slit means that fall within a limited end area thereof that is of lesser diameter than that of said hemispherical extension, said slit means being capable of being opened by pressure of liquid within said rubber element, said casing having adjacent said outlet end an internal annular seat of a diameter less than that of said hemispherical extension and greater than that of said limited end area containing said slit means whereby pressure exerted internally of said rubber valve element by flow of liquid from said inlet end toward said outlet end distends the rubber valve element axially toward said outlet end to press an annular portion of said hemispherical extension against said annular seat to seal off said air inlet means during flow of liquid through said slit means.

11. A valve construction as claimed in claim 10 in which said slit means comprises a plurality of substantially radial slits forming flap elements that are flexed into open position about respective axes that fall substantially within said limited end area and that are adjacent the annular region in which said hemispherical extension engages said annular seat whereby said annular seat forms a rigid external annular support about which said flap elements flex.

12. A valve assembly comprising a casing of circular cross-section having an inlet end and an outlet end and having air inlet port means in the wall thereof intermediate of said inlet and outlet ends, said casing having intermediate of said inlet end and said port means an internal annular shoulder, a sleeve member of relatively rigid material and of lesser diameter than the internal diameter of said casing and having a portion thereof interfitted with and thereby supported by said shoulder and being of an axial extent to overlie said port means, a rubber sleeve-like valve element secured and sealed at its upper end to said sleeve-like member and prevented by the portion of the latter that overlies said port means from being expanded by internal pressure into or against said port means and extending toward said outlet end, said casing having intermediate of said outlet end and said sleeve-like member annular valve seat means against which said valve element is pressed by internal pressure to seal off said port means.

13. A valve assembly comprising a casing of circular cross-section having an inlet end and an outlet end and having air inlet port means in the wall thereof intermediate of said inlet and outlet ends, said casing having adjacent said inlet end and above said port means an internal annular supporting shoulder, a rubber sleeve-like valve element of lesser diameter than the internal diameter of said casing and of an axial dimension to extend from said shoulder past said port means and toward said outlet end, a sleeve-like member of rigid material extending externally about said rubber element from said shoulder downwardly to overlie said air port means and being of lesser diameter than the internal diameter of said casing and thereby spaced inwardly from the latter and from said port means, means securing said rigid sleeve member mechanically to said shoulder and for securing said rubber element in sealed connection with at least an upper portion of said rigid sleeve-like member, whereby said rigid sleeve-like member and said rubber valve element are supported in depending relation from said shoulder and whereby the end of said casing adjacent said inlet end has a free and exposed portion substantially unobstructed by said rubber valve element, said casing having intermediate of said outlet end and said port means annular valve seat means against which said rubber valve elements is pressed by internal pressure to seal off said port means, said rigid sleeve-like member holding the adjacent portion of said rubber valve element against being expanded by internal pressure into or against said air port means and against outward distortion by entry through said inlet end of a foreign rigid material or member.

14. A valve assembly as claimed in claim 13 in which there is an elastic connecting nipple at least a portion of which is accommodated within the mouth defined by said unobstructed portion of said casing adjacent said inlet end, said nipple being in sealed connection with said shoulder and the opening in said elastic nipple being substantially coaxial with said rubber valve element.

15. A valve assembly as claimed in claim 13 in which said rubber valve element has an extension outwardly of said inlet end and extending coaxially beyond said free casing portion to form an external elastic connecting nipple.

16. A valve assembly as claimed in claim 13 in which said free casing portion is threaded and has a coaxial end annular face against which to receive a gasket, and a pipe coupling in threaded connection with said threaded portion and provided with an annular face mating with said coaxial annular face, said coupling having an external downward flange-like extension spaced from and overlying said port means to form an external protective apron therefor.

17. A valve assembly as claimed in claim 13 in which said free casing portion is threaded and has a coaxial end annular face, said rubber valve element having a laterally thickened extension thereof outwardly of said inlet end and extending beyond said free casing portion to form an elastic connecting nipple, and a threaded sleeve-like element in threaded connection with said threaded portion and provided with an annular face abutting against said coaxial annular face and having an external downward flange-like extension spaced from and overlying said port means to form an external protective apron therefor and having a portion extending beyond said free casing portion and laterally surrounding at least a portion of said nipple-forming extension to laterally support the latter.

ORMONDE J. BURKE.